(12) United States Patent
Wegner et al.

(10) Patent No.: US 8,820,990 B2
(45) Date of Patent: Sep. 2, 2014

(54) VEHICLE LAMP AND METHOD FOR MANUFACTURING A TRANSPARENT ELEMENT FOR A VEHICLE LAMP

(75) Inventors: Berend Wegner, Wolfsburg (DE); Henning Kiel, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 811 days.

(21) Appl. No.: 12/747,215

(22) PCT Filed: Dec. 4, 2008

(86) PCT No.: PCT/EP2008/066820
§ 371 (c)(1),
(2), (4) Date: Sep. 20, 2010

(87) PCT Pub. No.: WO2009/074510
PCT Pub. Date: Jun. 18, 2009

(65) Prior Publication Data
US 2011/0019431 A1    Jan. 27, 2011

(30) Foreign Application Priority Data

Dec. 10, 2007   (DE) .................... 10 2007 059 778

(51) Int. Cl.
*F21V 9/00*   (2006.01)
*B29C 45/16*  (2006.01)
*F21S 8/10*   (2006.01)

(52) U.S. Cl.
CPC ......... *B29C 45/16* (2013.01); *B29K 2995/0018* (2013.01); *F21S 48/2287* (2013.01); *B29C 45/1615* (2013.01); *F21S 48/2268* (2013.01); *F21S 48/1241* (2013.01); *G02B 6/0001* (2013.01); *F21S 48/1233* (2013.01); *F21S 48/2243* (2013.01)
USPC .......................................... 362/511; 362/555

(58) Field of Classification Search
USPC .................................................. 362/511, 555
See application file for complete search history.

(56) References Cited

U.S. PATENT DOCUMENTS 5,684,633 A * 11/1997 Lutz et al. ...................... 359/588
5,927,850 A    7/1999 Osada ........................... 362/554

(Continued)

FOREIGN PATENT DOCUMENTS

| DE | 2063084 | 6/1971 | ............... F21P 3/00 |
| DE | 10208140 | 9/2003 | ............... F21S 8/10 |
| DE | 10328216 | 1/2005 | ............... F21S 8/10 |
| DE | 69832106 | 7/2006 | ............... G02B 6/02 |
| DE | 102005019093 | 10/2006 | ............... F21S 8/10 |
| DE | 102005038154 | 2/2007 | ............... F21S 8/10 |
| DE | 102005042675 | 3/2007 | ............... F21V 8/00 |
| DE | 102005059958 | 6/2007 | ............... F21V 8/00 |

(Continued)

OTHER PUBLICATIONS

International Search Report for Application No. PCT/EP2008/066820 (4 pages), Mar. 13, 2009.

*Primary Examiner* — Sean Gramling
(74) *Attorney, Agent, or Firm* — King & Spalding L.L.P.

(57) ABSTRACT

A vehicle lamp has at least one transparent element (10), and at least one main light source, whose emitted light passes the optical boundary layers of the at least one transparent element (10) substantially perpendicularly. The at least one transparent element (10) has at least two optical areas (12, 20, 26) with different optical indices of refraction which adjoin one another along at least one optical boundary layer (16, 24), and at least in one of the adjoining optical areas (12), whose index of refraction is greater than the index of refraction of the adjoining optical area (20, 26), the light of at least one light source is coupled via at least one light coupling point (22) into a direction pointing substantially along the at least one optical boundary layer (16, 24), and the introduced light is decoupled via at least one light decoupling point (14).

14 Claims, 2 Drawing Sheets

(56) References Cited

U.S. PATENT DOCUMENTS

| | | | |
|---|---|---|---|
| 5,982,969 A | 11/1999 | Sugiyama et al. | 385/123 |
| 6,896,397 B2* | 5/2005 | Yamada et al. | 362/511 |
| 7,494,257 B2 | 2/2009 | Gebauer et al. | 362/511 |
| 7,703,960 B2 | 4/2010 | Befelein et al. | 362/511 |
| 2004/0158028 A1 | 8/2004 | Buhler | 528/331 |
| 2004/0208016 A1* | 10/2004 | Kazaoka et al. | 362/511 |
| 2006/0234612 A1 | 10/2006 | Gotthardt | 452/58 |
| 2008/0112183 A1* | 5/2008 | Negley | 362/555 |

FOREIGN PATENT DOCUMENTS

| | | | |
|---|---|---|---|
| DE | 102006007134 | 8/2007 | F21S 8/10 |
| DE | 102006009317 | 9/2007 | F21S 8/10 |
| DE | 102006011108 | 9/2007 | B60Q 1/26 |
| DE | 102006016656 | 10/2007 | F21V 8/00 |
| DE | 102006027970 | 10/2007 | F21S 8/12 |
| WO | 02090421 | 11/2002 | C08G 69/26 |
| WO | 2006079947 | 8/2006 | F21S 8/10 |
| WO | WO 2006079947 A1 * | 8/2006 | F21S 8/12 |

* cited by examiner

US 8,820,990 B2

VEHICLE LAMP AND METHOD FOR MANUFACTURING A TRANSPARENT ELEMENT FOR A VEHICLE LAMP

CROSS-REFERENCE TO RELATED APPLICATIONS

This application is a U.S. National Stage Application of International Application No. PCT/EP2008/066820 filed Dec. 4, 2008, which designates the United States of America, and claims priority to German Application No. 10 2007 05 778.0 filed Dec. 10, 2007. The contents of which are hereby incorporated by reference in their entirety.

TECHNICAL FIELD

The invention relates to a vehicle lamp and a method for manufacturing a transparent element for a vehicle lamp.

BACKGROUND

It is well known that the change of direction of an electromagnetic wave caused by a local change of its propagation velocity is denoted a light refraction which is described by an index of refraction n. The refraction occurs "towards the perpendicular" when a beam of light enters a medium comprising a greater index of refraction (for example from air into water or glass). When light waves or other electro-magnetic waves impinge from one medium (for example air) onto another (for example glass) whose index of refraction differs from that of the former a part of the light is reflected, another part is subjected to a deflection according to the law of refraction by Snellius. Upon a transfer into a medium comprising a greater index of refraction the beam of light is refracted towards a perpendicular line of the separation plane, therefore becomes steeper, and in a medium comprising a smaller index of refraction is refracted away from the perpendicular line. In the latter case there will be a total reflection when the angle of incidence c exceeds a certain value. For example, air has an index of refraction of about 1.00029 and transparent plastics and glasses have indices of refraction between about 1.3 and 1.7. Based on this physical effect is the mode of operation of fiber-optic light guides which have become widely used as glass fibers for data communication.

Known in vehicle lamps is the use of fiber-optic light guides as substantially rod shaped elements by which the light of a light source, which often has one or more compact light sources, is directed to a for example poorly reachable location inside of the vehicle lamp and is decoupled there and thereby is made visible. The light such guided is not noticeable from a viewing direction directed lateral perpendicular to the light guide because the beams of light impinge relatively flat at the refraction media transfer plane in the fiber-optic light guide and are reflected completely. At designated light emission locations light decoupling means are provided for, which are formed as optical prism, lenses or a surface roughness.

For example, DE 102 08 140 A1 shows an illumination equipment for motor vehicles comprising a main light source contained in a housing and an auxiliary light source. It is provided for that the radiating surface of the light emitted by the main light source is at least partially interspersed with at least one light guiding element, wherein the light of the auxiliary light source is coupled into the light guiding element.

For example, known from DE 103 28 216 A1 is an illumination equipment for vehicles, in particular a signal lamp, comprising a lamp and at least one rod-shaped light guide comprising a light coupling plane arranged in the radiation area of the lamp. In doing so, the light guide in its outer perimeter has several optical decoupling elements shifted with respect to each other at which inside of the light guide light impinging thereon is reflected such that it leaves therefrom at a perimeter area opposite of the respective decoupling element of the light guide. Between the decoupling elements decoupling-free intermediate areas are provided for. In doing so, the length of the intermediate areas and the length of the decoupling areas may be varied along the length of the light guide. In this manner it is to be achieved that along the extension direction of the light guide a brightness distribution of the light decoupled from the light guide, which is deviating from the respective amount of light available in the light guide, is rendered possible. Nevertheless, the light guide shall have a uniform appearance. In doing so, the light guide generally is based on the principle of total reflection inside of the light guide, until the light impinges a decoupling element and then is redirected such that it impinges the wall of the light guide in such an angle that it may be decoupled therefrom. When the light does not impinge onto a decoupling element the light may not leave the light guide and is transmitted to the end of the light guide. Then, the light is reflected back at the end of the light guide and impinges onto a further diverting side of the decoupling element and thereby is decoupled from the light guide in a common manner.

DE 10 2006 011 108 A1 discloses the use of fiber-optic light guides for illuminating the inner edge of a vehicle door or a trunk lid or the like, wherein the light guide follows the contour of the edge of the door.

DE 10 2005 042 675 A1 discloses a vehicle in which the light of a central light source is guided via extended light guides to several illuminants located in front and rear areas of the vehicle.

DE 10 2005 019 093 B4 discloses a multiple light guide used in a vehicle lamp which constitutes a merger of several light guides extending with an angle to each other. The beams of light from each of the light guides cross each other and each leave the light guide at an individual light decoupling position.

DE 10 2006 027 970 A1 discloses a headlight in which the head lamp unit is encased by a transparent hollow part which serves as the light guide and is dedicated to the operation of the daytime running light. This solution implicates additional costs and widely determines the embodiment of a headlight.

DE 103 28 216 A1 discloses a vehicle lamp comprising a rod-shaped light guide which is used to direct the light of a point light source inside the housing of a lamp into a desired area which otherwise may only illuminated poorly. DE 10 2005 059 958 A1 also discloses an illumination equipment which uses an additional substantially rod-shaped light guide in which the light decoupling elements are formed as inclined faces. DE 10 2005 038 154 A1 discloses a vehicle lamp comprising a rod-shaped light guide which is irradiated by several light sources in order to provide for a more uniform illumination of a lengthwise extending light decoupling area. Such light guides are additional components which render a vehicle lamp more costly and more complex. In addition, at the surfaces of additional light guides dust and deposits may be deposited also inside of a lamp housing and may interfere with the operation as well as the optical appearance.

SUMMARY

According to various embodiments, in a vehicle lamp light guides can be provided for performing different signal functions, for illuminating areas or beam angles difficult to illuminate and as an optical forming means in a particularly cost effective manner and in this connection to realize a dustless and dirt-free, particularly compact constructive form and to allow for new design possibilities of a lamp.

According to an embodiment, a vehicle lamp may comprise at least one transparent element and at least one main light source, whose emitted light passes the optical boundary layers of the at least one transparent element substantially perpendicularly, wherein the at least one transparent element has at least two optical areas comprising different optical indices of refraction which adjoin one another along at least one optical boundary layer, and at least in one of the adjoining optical areas, whose index of refraction is greater than the index of refraction of the adjoining optical area, the light of at least one light source is coupled via at least one light coupling point into a direction pointing substantially along the at least one optical boundary layer, and the introduced light is decoupled via at least one light decoupling point.

According to a further embodiment, the adjoining optical areas can be arranged one upon the other comprising different indices of refraction in terms of the main light direction of radiation of the light of the light source passing substantially perpendicularly therethrough, so that they are traversed by the light of the at least one main light source one after another as layers. According to a further embodiment, the optical areas adjoining one another in the main light direction of radiation at least in sections can be arranged in at least three layers one upon the other, wherein the inner optical area intermediate between the two outer optical areas has the greater index of refraction than the two outer ones. According to a further embodiment, the outer and the inner optical layer area may encompass the total area of the transparent element. According to a further embodiment, the inner optical layer area only encompasses at least a partial area of the transparent element. According to a further embodiment, the partial area of the transparent element formed by the inner optical layer area can be formed by straight or curved lines, wherein the curvature is chosen such that the introduced light is reflected at lateral faces of the inner optical layer area. According to a further embodiment, the adjoining optical areas can be arranged side by side comprising different indices of refraction in terms of the propagation direction of the light of at least one main light source passing substantially perpendicularly therethrough so that they are traversed by the light of the at least one main light source in parallel, that is independently in each case. According to a further embodiment, the transparent element can be an intermediate light panel. According to a further embodiment, the transparent element can be a cover panel. According to a further embodiment, the at least one light decoupling element can be formed by one or more integrally formed optical functional components such as prism, lenses, mirrors or roughened surfaces. According to a further embodiment, the at least one light decoupling element can be arranged at an arbitrary position along the optical area provided for guiding the light. According to a further embodiment, the at least one available or additional light source, whose light is coupled inside of the optical boundary layers of an optical area of the transparent element, can be a luminescent diode or the like. According to a further embodiment, the light radiated from at least one light decoupling element can be dedicated to at least one of the signal light functions such as brake light, parking light, turn-signal indicator, side marker light, daytime running light or the like. According to a further embodiment, the vehicle lamp can be formed as a headlight, rear light, side mirror lamp, fog light or the like.

According to another embodiment, in a method for manufacturing a face-like, curved or flat colored or achromatic transparent element of a lamp by means of a synthetic material molding process, the transparent element is manufactured in at least two consecutive synthetic material molding steps, wherein in each case a transparent substance comprising an index of refraction different from the other is used.

BRIEF DESCRIPTION OF THE DRAWINGS

In the following the invention is described by means of the corresponding drawings using exemplary embodiments. In the drawings.

DETAILED DESCRIPTION

Figure 1:
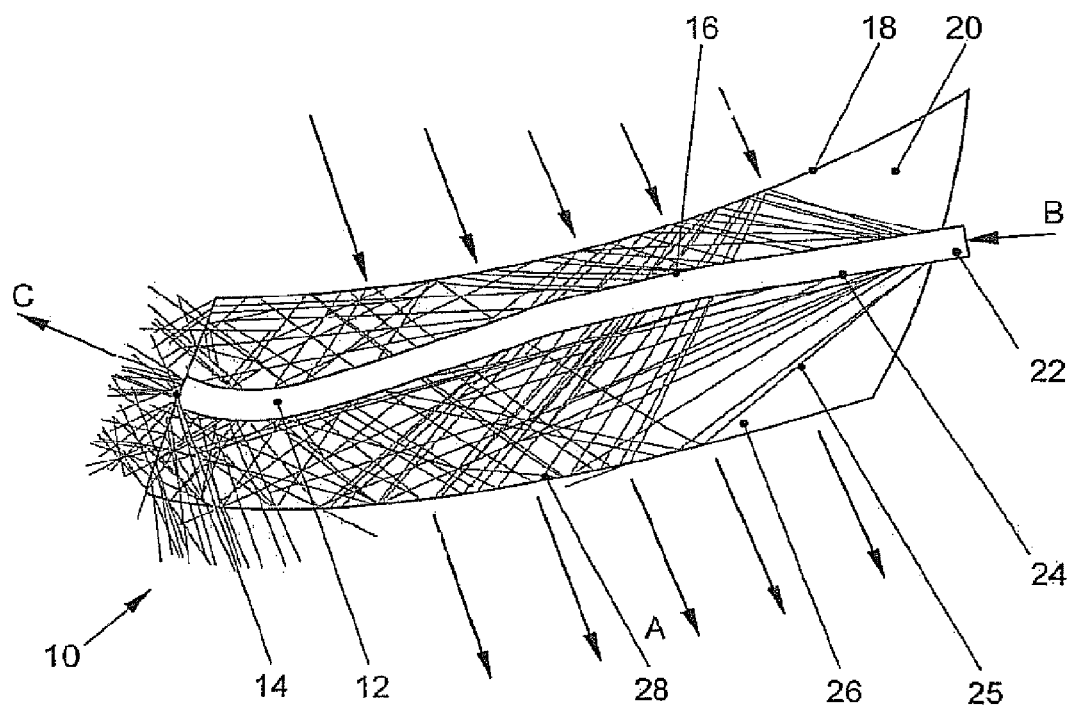
FIG. 1 shows a schematic cross-sectional view of a transparent element of a lamp in a three-layer embodiment.

According to various embodiments, in a vehicle lamp comprising at least one face-like, curved or flat colored or achromatic transparent element, comprising at least one main light source, whose emitted light passes the optical boundary layers of the transparent elements substantially perpendicularly, in at least one transparent element at least two optical areas adjoining each other at least one boundary layer have different optical indices of refraction and at least in one of the adjoining optical areas, whose index of refraction is greater than the index of refraction of the adjoining optical area, the light of at least one available or at least one additional light source is introduced via at least one light coupling point in a direction substantially pointing along the at least one optical boundary layer that is substantially crosswise to the main light direction of radiation of the vehicle lamp, and the introduced light is decoupled via at least one light decoupling point.

In the sense of the invention the term transparent is to mean an optical or at least semi-optical transparent material.

In an embodiment the adjoining optical areas comprising different indices of refraction are arranged one upon the other in the sense of the propagation direction of the light of the light source passed therethrough substantially perpendicularly so that they are traversed one after another by the light of the at least one main light source. Thus, the two or more adjoining optical areas are arranged one on top of the other as layers. The main light of one or more light sources available in a lamp may pass the layered optical areas mostly unrestricted and hardly affected, whereby the main function of the lamp is maintained. The light introduced according to various embodiments into at least one of the layered optical areas thus proceeds substantially crosswise with respect to the light propagation direction of the main light sources and therefore again hardly interferes provided that no specific light decoupling point, which will be discussed in the following, is arranged in the light guiding layer.

In a further embodiment the adjoining optical areas at least in sections are arranged in at least three layers one upon the other, wherein the inner optical layer area located in between the two outer layer areas has the greater index of refraction than the two outer ones. Thereby the light guiding layer is completely enclosed in an outer optical medium and therefore has two boundary layers which firstly are arranged absolutely dustless and free of dirt residues and secondly have an internal and an external optical boundary layer in which different light decoupling elements may be realized which significantly increase the design flexibility. In yet a further embodiment the outer and the inner optical layer area encompass the total area of the transparent element of the lamp. As a result of this an optically particularly unobtrusively designed light guiding function may be implemented in a lamp. The inner optical layer area may also only comprise at least one partial area of the transparent element, whereby an integrated light guide of arbitrary form is allowed for.

In yet a further embodiment the partial area of the transparent element formed by the inner optical layer area is formed by straight or curved lines or faces, respectively, wherein the curvature is chosen such that the introduced light is also reflected at lateral faces of the inner optical layer area.

The adjoining optical areas comprising different indices of refraction in a further embodiment are arranged side by side in the sense of the propagation direction of the light of at least one main light source passing therethrough substantially perpendicularly so that they are traversed by the light of the at least one main light source in parallel, that is in each case independently. As a result of this, applications are feasible in which a light guiding area is not formed as a layer enclosed by containing areas but as an area adjoining to adjoining optical areas comprising a preferably smaller index of refraction. Thus, such an optical area has two (however, at least one) laterally arranged optical boundary layers each comprising another adjoining optical medium such as glass or transparent synthetic material, and in each case an optical boundary layer to the surrounding air on the outwardly and inwardly oriented face of the transparent element of a lamp. In this case, the optical layer area comprising a greater index of refraction also only forms at least one partial area of the transparent element, however principally, whereby in a further embodiment a partial area of the transparent element formed by means of the optical layer area comprising a greater index of refraction may be formed by means of straight or curved lines or faces, respectively, wherein the curvature is chosen such that the introduced light is reflected at lateral faces of the inner optical layer area.

The area of the index of refraction of the optical substances used in a transparent element may be between 1.3 and 1.7. The substances may be used made of glass as well as made of transparent synthetic material.

In a further embodiment the transparent element may be an intermediate light panel in a lamp and in yet another embodiment a covering panel or in both use cases, respectively, may be installed in the inside of a lamp.

The at least one light decoupling element in a further embodiment may be formed by one or more integrally formed optical functional components such as prism, lenses, mirrors or roughened surfaces. In yet a further embodiment the at least one light decoupling element may be arranged at an arbitrary position along the optical area provided for introducing the light. As a result of this, for example a decoupling of light with desired intensity, desired angle of radiation and desired rate of dispersion may be realized at an edge of the lamp as well as in an area arranged such that it is brought forward from the edge to the center of the lamp, whereby further degrees of freedom are made feasible for the design and the structure of a lamp.

The light decoupled by means of the light decoupling element preferably is emitted in a direction visible from the outside of the vehicle lamp.

The at least one available or additional light source whose light is coupled inside of the optical boundary layers of an optical area of the transparent element may preferably be a light emitting diode, an incandescent lamp or an arbitrary other light source.

The at least one light coupling element preferably may have at least one optical means such as a flat or curved surface, a lens, prism, mirrors or the like.

In a further embodiment the light emitted form at least one light decoupling element is at least assigned to one of the signal light functions such as brake light, parking light, turn-signal indicator, side marker light, daytime running light or the like. It also may serve a sole decorative purpose, for example to achieve a decorative border in a nighttime design of a lamp.

According to various embodiments the lamp comprising one or more of the above described characteristics may be implemented as a headlight, a rear light, a side mirror lamp, a fog light and the like.

According further embodiment, in a method for manufacturing a face-like, curved or flat colored or achromatic transparent element of a lamp, a multi-part synthetic material molding process is used advantageously such that the transparent element is produced in at least two consecutive synthetic material molding steps, wherein in each case a transparent substance comprising an index of refraction different to the other is used. For example, in the first molding step either a first transparent layer or transparent section of an intermediate light panel (transparent element) may be produced, subsequently as a second layer a light guiding layer may be sprayed on using a modified tool assembly, and possibly after that yet a transparent layer may complete the light guiding layer. Thus, the optically different areas of the transparent element of a lamp according to various embodiments are formed integrally comprising a fixed connection. The method concerning this is well known and is mostly used for using differently colored synthetic materials in one die casting.

Alternatively, according to further embodiments, the method for manufacturing a face-like, curved or flat colored or achromatic transparent element of a lamp by means of a synthetic material molding process with an inlay element may be used such that a partial element produced in a first synthetic material molding step from a transparent substance comprising a first index of refraction is withdrawn from a first injection mold or tool, respectively, in an intermediate step at least one partial element is inserted into a second injection mold and in a at least second synthetic material molding step another transparent substance comprising a second index of refraction is injected. Thus it is feasible, for example to integrate rod shaped light guides into a transparent element of a lamp in an enclosing or partially enclosing manner.

FIG. 1 shows a schematic cross-sectional view of a transparent element 10 of a lamp according to various embodiments in a three-layer embodiment.

The transparent element 10 may for example be an intermediate light panel or a covering panel of a vehicle lamp, wherein the arrows A indicate the emitting direction of a at least one main light source (not shown) whose light passes the layers of the transparent element 10.

The transparent element 10 has a first layer or layer area 20 which is made of a first transparent substance, preferably a synthetic material, which layer is arranged as a wall facing inward towards the main light source (not shown) and has an optical boundary layer 18 with respect to the surrounding air.

Arranged in a gapless manner directly adjacent to this first layer is a second transparent area or layer 12 so that an optical boundary layer 16, which is internal to the transparent element 10, is formed between these two layers.

Interfacing to the second layer or layer area 12 in the same manner is a further third transparent layer 26 which also forms an optical boundary layer 24 together with the former and forms an optical boundary layer 28 with respect to the surrounding air with its outside facing away from the main light source (not shown).

Preferably, the second intermediate layer 12 is made of a transparent synthetic material comprising a greater index of refraction than the two adjoining transparent layers, so that in this way a light radiation B (arrow B) introduced laterally by means of a light coupling point 22 due to a sufficiently shallow angle of impact is reflected mutually at the two depicted optical boundary layers 16, 24 in a substantially crosswise manner with respect to the main light propagation direction A of the main light source (not shown) and thereby a light guide is formed in the intermediate layer.

The lines of the beams of light 25 plotted in the depiction show a statistical distribution in which only a small part of light passes through the two optical boundary layers 16, 24 located inside the transparent element 10 and subsequently is reflected at the outer optical boundary layers 18, 28 in the same manner so that also in this optical area it is a matter of a light guide in which light passes through in a captured and guided manner. With a suitable selection of the indices of refraction of the transparent layers 20, 12 and 26 and a preferably focussed light coupling by means of the light coupling point 22 a practically total guidance of light may be achieved so that the light guiding inner layer or area 12 is perceived as transparent and unlighted from the outside.

The light guiding inner layer 12 may extend across the complete surface of the transparent element 10 in a direction perpendicular to the illustration plane in FIG. 1 of a lamp or form an area delimited in this direction. In the latter case, in addition two optical boundary layers are generated which capture the light also in the direction of the depth and guide it, whereby a rod-shaped light guide inside of a transparent element 10 is formed. As a result of this the light may be guided focussed more narrow and thus be more intensive and in a transparent element 10 several rod-shaped light guides may be realized which are dedicated to different functions, colors and geometric forms.

The optical material of the first layer 20 and the third layer may be the same as well as different. As shown in FIG. 1, the transparent layers may have a thickness varying across the cross-sectional profile as well as a uniform thickness and may comprise curvatures and even sharp bends as long as it is ensured that the light is not unintentionally decoupled from the light guiding layer.

In order to make visible the coupled light from the outside the at least one light decoupling point 14 is required which, as depicted, simply may be a transparent surface arranged substantially perpendicular with respect to the main propagation direction C of the coupled light. In further embodiments light decoupling points may be prism, lenses, mirrors and roughened surfaces which may be located at an arbitrary position along the light guiding layer 12 or the rod-shaped light guide 12. These light decoupling points may have specific surface forms which have an arbitrary predetermined design.

Figure 2:
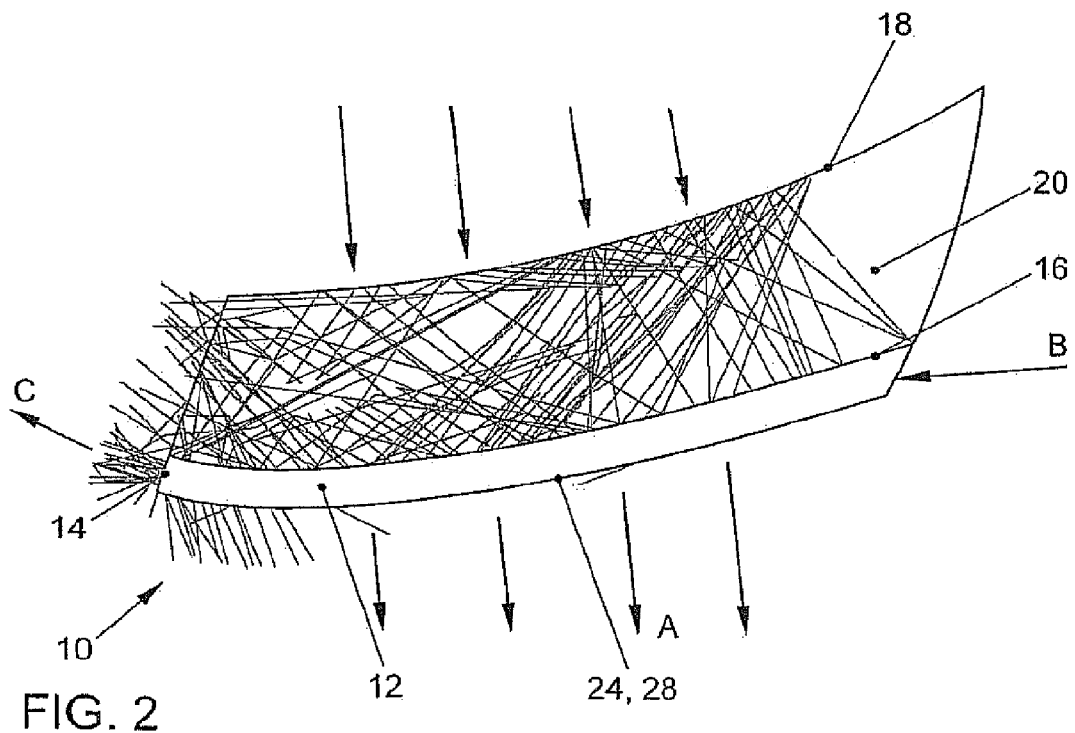
FIG. 2 shows a schematic cross-sectional view of a transparent element of a lamp in a two-layer embodiment.

Depicted in FIG. 2 is a schematic cross-sectional view of a transparent element 10 of a lamp according to various embodiments in a two-layer embodiment. It is a simplified embodiment of the previously described three-layer embodiment of a transparent light panel, wherein one of the two outer layers is omitted. It merely plays a creative role, whether here the internal transparent layer 20 facing towards the main light source (not shown) or the exterior transparent layer 26 facing away from the main light source (not shown) is omitted, whereby an additional creative means has originated. The remaining two transparent layers just as well serve the intended purpose to realize a light guiding layer or element, respectively, since the outer air comprising an index of refraction of almost 1.0 is even more pronouncedly below the index of refraction of the light guiding layer 12, whereby the reflecting effect of the now outer optical boundary layer 24, 28 works out even better.

Apart from that, the functionality described in FIG. 1 is the same so that a repeated explanation may be abandoned.

Figure 3:
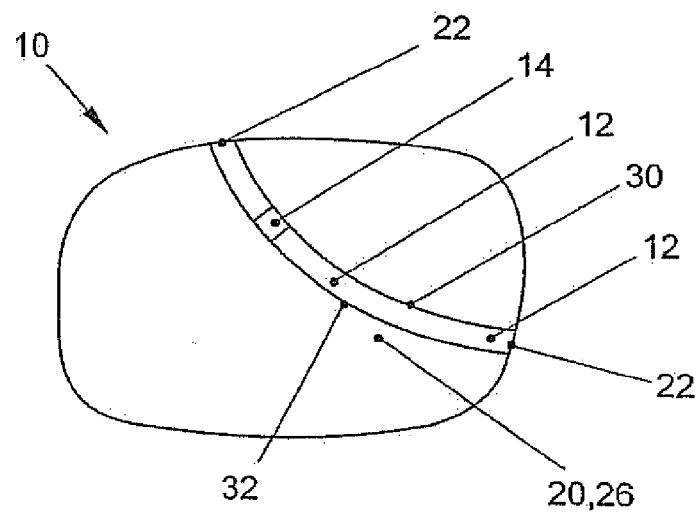
FIG. 3 shows a schematic top view of a transparent element of a lamp according to an embodiment.

FIG. 3 shows a schematic top view of a transparent element 10 of a lamp according to various embodiments as it is visible from a frontal viewing direction onto a vehicle lamp, for example.

Here, the light guiding layer area 12, as already mentioned above, does not extend across the complete surface of the transparent element 10 but is formed as a relatively narrow band which therefore comprises two lateral additional optical boundary layers 30, 32. The band 12 for example is formed in a curved manner in order to such possibly feed light from a for example additional light source to a certain section of the transparent element 10.

Further, in this embodiment the light is coupled into the light guiding band 12 via two light coupling points 22 at the edge of the transparent element 10, for example to thereby achieve a better illumination. As an example, in this embodiment the light coupled into the light guiding band 12 is emitted preferably in a direction towards the outside of the lamp via a light decoupling point 14. The position, number and the form of the light decoupling points 14 may be provided for arbitrarily.

A possibility as decoupling means are integrally formed prism, lenses, mirrors and roughened surfaces whose roughness grade may have different grades.

Figure 4:
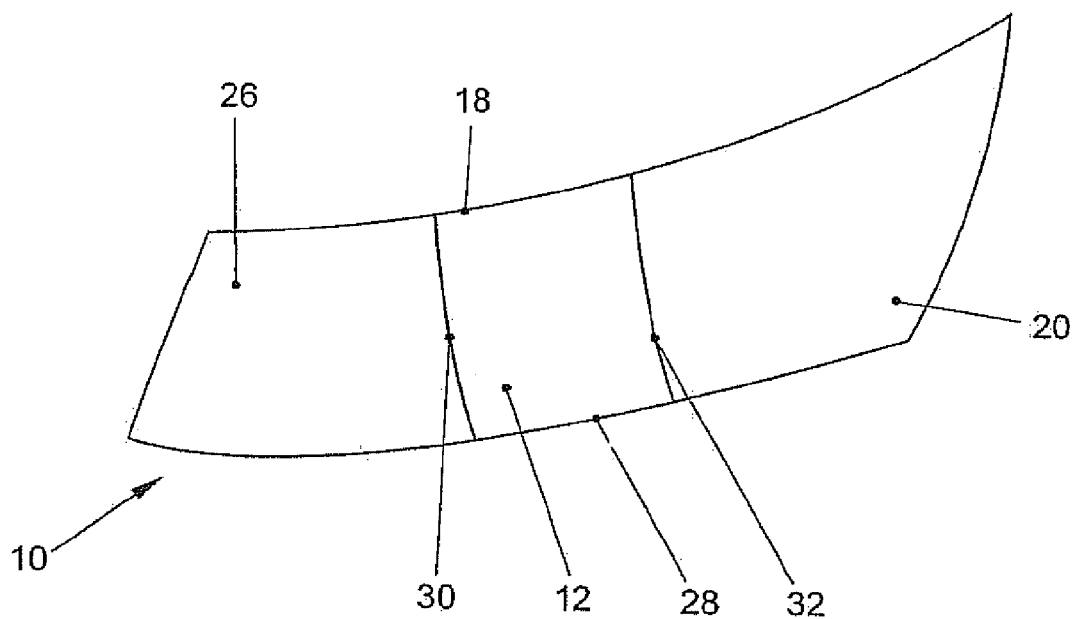
FIG. 4 shows a schematic cross-sectional view of a transparent element of a lamp in an embodiment comprising transparent areas arranged side by side.

FIG. 4 shows a schematic cross-sectional view through a transparent element 10 of a lamp in an embodiment alternatively comprising transparent areas 26, 12 and 20 arranged side by side instead of one upon the other.

In doing so, the light introduced into a band-like optical area as depicted in FIG. 3 and comprising a greater index of refraction than the adjoining optical areas 20 and 26 is emitted perpendicularly into the illustration plane for example via at least one light coupling point 22 (not shown) at the edge of the transparent element 10 and is guided between altogether four optical boundary layers 18, 28, 30, 32 in a reflecting manner.

This arrangement may cause further creative advantages as well as advantages related to manufacturing processes.

The preceding embodiments are merely exemplary and are not to be construed as to limit the present invention. The present inventive teaching may easily be transferred to other applications. The description of the exemplary embodiments is intended for illustration and not to limit the scope of the patent claims. Many alternatives, modifications and variants are apparent to a person skilled in the art in an average manner without deviating from the scope of the present invention which is defined in the following claims.

REFERENCE NUMERALS 10 transparent element
12 inner optical area, layer, layer area
14 light decoupling point/element
16 internal optical boundary layer
18 inner optical boundary layer
20 outer optical area, layer, layer area
22 light coupling point/element
24 internal optical boundary layer 25 light path line
26 outer optical area, layer, layer area
28 outer optical boundary layer
30 lateral optical boundary layer
32 lateral optical boundary layer
A main direction of light radiation
B coupled light radiation
C decoupled light radiation

What is claimed is:

1. A vehicle lamp comprising:
   a transparent element comprising:
      a first contiguous optical area formed a first transparent substance, and
      an elongated second optical area formed from a second transparent substance, the elongated second optical area extending through the first contiguous optical area, the first and second optical areas adjoining one another along an optical boundary layer extending fully around an outer circumference of the elongated second optical area, such that the optical boundary layer is internal to the transparent element, and such that in a cross-section perpendicular to the elongated second optical area, the second optical area is surrounded by the first contiguous optical area, each optical area defined by a corresponding optical index of refraction;
      wherein the elongated second optical area defines a straight or curved rod-shaped light guide; and
      wherein the rod-shaped second optical area has a greater optical index of refraction than the first contiguous optical area surrounding the rod-shaped second optical area;
   a first light source coupled via a light coupling point into the rod-shaped second optical area along a direction of elongation of the second optical area;
   light from the first light source decoupled via at least one light decoupling point along the rod-shaped second optical area;
   at least one second light source emitting light toward the transparent element such that a first portion of the light passes sequentially through a first portion of the first contiguous optical area, through the optical boundary layer and through the rod-shaped second optical area, and through a second portion of the first contiguous optical area, such that a second portion of the light passes through the transparent element without encountering the optical boundary and rod-shaped second optical area; and
   the rod-shaped second optical area appearing transparent and unlighted by the first light source from outside the vehicle lamp except at the at least one light decoupling point along the rod-shaped second optical area based at least in part on the relative optical indices of refraction of the two optical areas.

2. The vehicle lamp according to claim 1, wherein the adjoining optical areas are arranged one upon the other comprising different indices of refraction in terms of a main light direction of radiation of the light of the at least one second light source passing substantially perpendicularly there through, so that they are traversed by the light of the at least one second light source one after another as layers.

3. The vehicle lamp according to claim 2, wherein the optical areas adjoining one another in the main light direction of radiation of the light of the at least one second light source at least in sections are arranged in at least three layers one upon the other to define an inner optical layer area between two outer optical layer areas, wherein the inner optical layer area between the two outer optical layer areas has a greater index of refraction than the two outer optical layer areas ones.

4. The vehicle lamp according to claim 1, wherein the adjoining optical areas are arranged side by side comprising different indices of refraction in terms of a propagation direction of the light of the at least one second light source passing substantially perpendicularly there through so that they are traversed by the light of the at least one second light source in parallel, that is independently in each case.

5. The vehicle lamp according to claim 1, wherein the transparent element is an intermediate light panel.

6. The vehicle lamp according to claim 1, wherein the transparent element is a cover panel.

7. The vehicle lamp according to claim 1, the at least one light decoupling point is formed by one or more integrally formed optical functional components such as prism, lenses, mirrors or roughened surfaces.

8. The vehicle lamp according to claim 1, wherein the at least one light decoupling point is arranged at an arbitrary position along the rod-shaped second optical area.

9. The vehicle lamp according to claim 1, wherein the first light source, whose light is coupled into the rod-shaped second optical area, is a luminescent diode.

10. The vehicle lamp according to claim 1, wherein the light radiated from at least one light decoupling point is dedicated to at least one of a brake light signal, a parking light signal, a turn-signal indicator signal, a side marker light, and a daytime running light.

11. The vehicle lamp according to claim 1, wherein the vehicle lamp is formed as a headlight, rear light, side minor lamp, fog light.

12. A method of operating a vehicle lamp, the method comprising:
   providing a transparent element comprising:
      a first contiguous optical area formed from a first transparent substance, and
      an elongated second optical area formed from a second transparent substance, the elongated second optical area extending through the first contiguous optical area, the first and second optical areas adjoining one another along an optical boundary layer extending fully around an outer circumference of the elongated second optical area, such that the optical boundary layer is internal to the transparent element, and such that in a cross-section perpendicular to the elongated second optical area, the second optical area is surrounded by the first contiguous optical area, each optical area defined by a corresponding optical index of refraction;
      wherein the elongated second optical area forms a straight or curved or rod-shaped light guide; and
      wherein the rod-shaped second optical area has an index of refraction greater than the index of refraction of the first contiguous optical area surrounding the rod-shaped second optical area;
   emitting light by first light source the light of a first light source being coupled via a light coupling point into the second optical area along a direction of elongated of the second optical area wherein the light coupled into the rod-shape second optical area is decoupled via at least one light decoupling point along the rod-shaped second optical area, and
   emitting light by a second light source toward the transparent element such that a first portion of the light passes sequentially through a first portion of the first contiguous optical area, through the optical boundary layer of the transparent element and through the rod-shaped second optical area, and through a second portion of the first contiguous optical area, and such that a second portion of the light passes through the transparent element without encountering the optical boundary and rod-shaped second optical area, wherein the rod-shape second optical area appears transparent and unlighted by the first light source from outside the vehicle lamp except at the at least one light decoupling point along the rod-shaped second optical area based at least in part on the relative optical indices of refraction of the two optical areas.

13. The method according to claim 12, further comprising the step of arranging the adjoining optical areas one upon the other comprising different indices of refraction in terms of the main light direction of radiation of the light of the second light source passing substantially perpendicularly there through, so that they are traversed by the light of the at least one second light source one after another as layers.

14. The method according to claim 13, further comprising the step of arranging the optical areas, adjoining one another in the main light direction of radiation of the light of the second light source at least in sections, in at least three layers one upon the other to define an inner optical layer area between two outer optical layer areas, wherein the inner optical layer area between the two outer optical layer areas has a greater index of refraction than the two outer optical layer areas ones.

\* \* \* \* \*